US009066210B2

(12) United States Patent
Kalita et al.

(10) Patent No.: US 9,066,210 B2
(45) Date of Patent: Jun. 23, 2015

(54) METHOD AND APPARATUS FOR AUTOMATIC MOBILE COMMUNICATIONS RESTRICTION

(71) Applicant: CELLCO PARTNERSHIP, Basking Ridge, NJ (US)

(72) Inventors: Samantha J. Kalita, Boston, MA (US); Dorothy Beau Morley, Wakefield, MA (US)

(73) Assignee: Cellco Partnership, Basking Ridge, NJ (US)

( * ) Notice: Subject to any disclaimer, the term of this patent is extended or adjusted under 35 U.S.C. 154(b) by 222 days.

(21) Appl. No.: 13/624,380

(22) Filed: Sep. 21, 2012

(65) Prior Publication Data

US 2014/0087708 A1    Mar. 27, 2014

(51) Int. Cl.
*H04W 24/00* (2009.01)
*H04W 4/04* (2009.01)
*H04W 4/00* (2009.01)
*H04W 4/02* (2009.01)
*H04W 4/22* (2009.01)

(52) U.S. Cl.
CPC ............. *H04W 4/04* (2013.01); *H04W 4/008* (2013.01); *H04W 4/027* (2013.01); *H04W 4/22* (2013.01)

(58) Field of Classification Search
USPC ............... 455/404.2, 418–419, 440–441, 455/456.1–456.4, 457, 575.9
See application file for complete search history.

(56) References Cited

U.S. PATENT DOCUMENTS

| | | | |
|---|---|---|---|
| 7,966,025 B1 * | 6/2011 | O'Neil ...................... 455/456.4 |
| 8,836,492 B2 * | 9/2014 | Akiyama ..................... 340/436 |
| 2007/0078600 A1 * | 4/2007 | Fregene et al. ................ 701/301 |
| 2010/0093375 A1 * | 4/2010 | Buckley et al. ............. 455/456.3 |
| 2010/0167716 A1 * | 7/2010 | Howarter et al. ............. 455/419 |
| 2012/0221209 A1 * | 8/2012 | Tatsukawa ...................... 701/42 |
| 2013/0084847 A1 * | 4/2013 | Tibbitts et al. ................ 455/419 |
| 2013/0113655 A1 * | 5/2013 | Shen et al. ............... 342/357.31 |

* cited by examiner

*Primary Examiner* — Dai A Phuong (57) ABSTRACT

Methods and related systems monitor a mobile communications device to determine if it is in a moving vehicle. If the device is determined to be in a moving vehicle, a database is accessed. The database contains information on locally imposed restrictions on usage of mobile communications devices while driving. The obtained information is used to impose appropriate communication restrictions on the mobile device. As long as the mobile communications device continues to be in the moving vehicle, its geographical location is monitored and, if it is determined that the device has entered a new geographical location, the database is again accessed and the restrictions are modified accordingly.

15 Claims, 3 Drawing Sheets

METHOD AND APPARATUS FOR AUTOMATIC MOBILE COMMUNICATIONS RESTRICTION

BACKGROUND

The distractions caused by operating a mobile communications device, such as a wireless phone and/or a mobile tablet, while in a moving vehicle may result in life threatening accidents. For example, a driver operating a moving vehicle may need to use one hand to hold his/her mobile device and/or split his/her attention between watching the road and dialing a number or reading a text message or email.

In the recent years, significant effort has been focused on preventing access to mobile communications devices while operating a motor vehicle. For example, in the United States, some regions have imposed restrictions on usage of mobile communications devices while driving. However, the restrictions imposed are not universal and may vary from one locality to another, with the geographical dividing lines perhaps being unclear. In addition, some municipalities continue to allow the usage of mobile devices while driving, but restrictions on usage of certain mobile communications features (e.g., text messaging) exist. Referring to states alone, as of July 2012, 10 states prohibit all drivers from using handheld cell phones while driving; 32 states ban all cell phone use by novice drivers (whose definition of age varies from state to state); school bus drivers in 19 states may not use a cell phone when passengers are present; 39 states ban text messaging for all drivers (5 additional states prohibit text messaging by novice drivers); 3 states restrict school bus drivers from texting. Arkansas and Illinois ban the use of handheld cell phones while driving in a school zone or in a highway construction zone. Texas bans the use of hand-held phones and texting in school zones. This becomes even more complicated as counties or even towns/cities may have even more restrictive ordinances on mobile device use than the region in which they are located.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain embodiments relate to automatically restricting mobile communications of a mobile communications device, while in a moving vehicle, depending on local laws and regulations. In some embodiments, a geographical location of a mobile communications device disposed in a moving vehicle is determined and information relating to communication restrictions to be imposed on the mobile communications device, due to being in the moving vehicle, in the geographical location is obtained. The obtained communication restrictions may then be imposed on the mobile communications device. In certain embodiments, the local laws and regulations may be available for display on the mobile communications device and/or on a display device connected to the mobile communications device. In certain embodiments, public notifications specific to mobile communications devices that are moving and in the specific geographical area may be provided to the mobile communications device through a similar communication path as the restriction information.

In some embodiments, the information may be obtained from a database that contains information on communication restrictions imposed on the mobile communications device, due to being in the moving vehicle, over various geographical locations. The communication restrictions may include legislatively imposed restrictions on usage of the mobile communications device while disposed in the moving vehicle in the geographical area.

In certain embodiments, the geographical location of the mobile communications device may be monitored and, in the event the mobile communications device has entered a new geographical location in which new communication restrictions are to be imposed on the mobile communications device due to being in the moving vehicle, the communication restrictions imposed on the mobile communications device may be modified. In some embodiments, the geographical location of the mobile communications device disposed in the moving vehicle may be determined over predetermined time intervals that may or may not be adjusted based on various factors.

The communication restrictions may include restrictions that reduce or restrict usage of mobile communications functions provided by the mobile communications device. In some embodiments, the mobile communications functions may include at least one of voice call, video call, web browsing, text messaging, instant messaging, or social networking (e.g., Twitter, Facebook, etc.). Connectivity restrictions can be invoked in several ways. In one example, connectivity restrictions are invoked by directly turning ON/OFF a mobile communication function. In another example, connectivity restrictions can be invoked by modifying the user interface for accessing that function (e.g., preventing access to certain features). For example, while a locality may not allow text messaging, it may allow text-to-speech conversion. In this example, the user interface would restrict the text messaging but modify the user interface such that text-to-speech conversion could be invoked.

In certain embodiments, the communication restrictions may be prevented from being imposed on the communications device in response to detecting that the mobile communications device is connected to a unit that provides hands-free access to the mobile communications device. In some embodiments, the communication restrictions may be prevented from being imposed on the communications device in response to receiving a request for conducting an emergency communications call.

Figure 1:
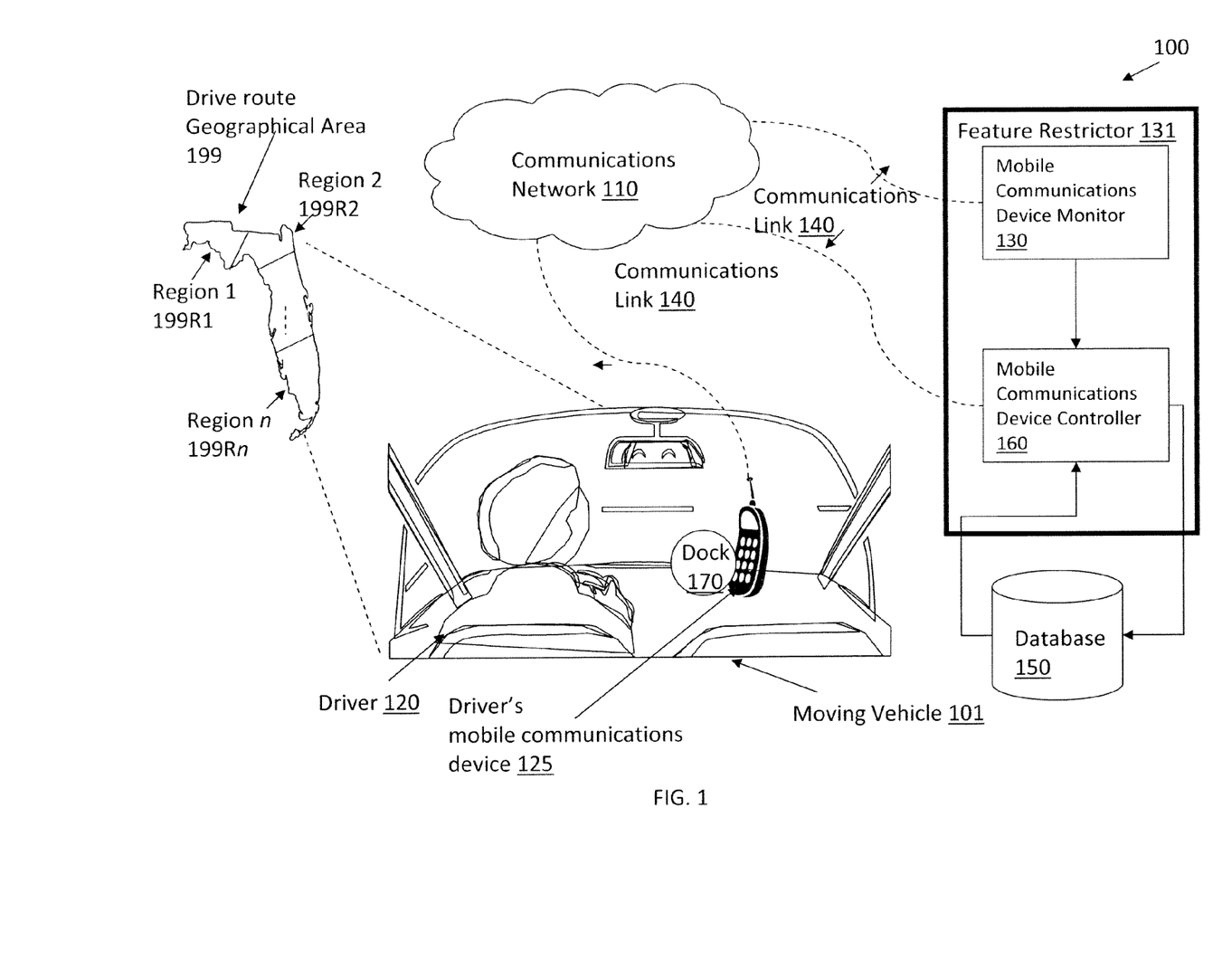
FIG. 1 is an illustration of a perspective view of certain embodiments disclosed herein.

FIG. 1 is an illustration of a perspective view of certain embodiments 100 disclosed herein. A driver 120, equipped with one or more mobile communications devices 125, may be traveling in a moving vehicle 101 through a driving route that covers a geographical area 199 that includes a number of localities 199R1, . . . , 199Rn. For example, assuming that the driver 120 is traveling in the continental United States, he/she may drive through a number of states. Although the localities are shown as relatively large regions of the state, as indicated they may be much smaller (e.g., counties, towns or cities, or smaller zones).

Each locality 199R1, . . . , 199Rn included in the driver's travel route may impose regionalized restrictions or limitations on usage of mobile communications devices while driving. For example, a first region 199R1 may allow a driver to utilize all available communication features (e.g., voice calls, text messaging, and web access) of his/her mobile communications device 125 while driving and not impose any restrictions or limitations on usage of mobile communications devices. A second region 199R2 may impose specified limitations and restrictions on some features while driving (e.g., text messaging and web access) but allow usage of other features (e.g., voice calls). A third region 199Rn may completely restrict handheld usage of mobile communications devices while driving.

The driver 120 may connect to a communications network 110, via a communications links 140, and thereby be able to communication through various communications functions (e.g., voice calls, video calls, data access, web browsing, text messaging, etc.) using his/her mobile communications device 125. Examples of the mobile communications devices 125 that may be used with the embodiments disclosed herein include, but are not limited to: mobile phones, mobile tablet computers, Personal Digital Assistants, portable televisions, laptop computers, mobile digital video recorders, etc.

In certain embodiments, a feature restrictor 131 may be utilized to monitor the mobile communications device 125 to determine whether the communications device is in a moving vehicle 101, and if so, control the communication features offered by the mobile communications device 125. In some embodiments, the feature restrictor 131 may be a downloadable application program that is downloaded in the mobile communications device 125 via a communications network 110 from an external source, such as a server (not shown). In some embodiments, the feature restrictor 131 may be maintained by a service provider that provides the mobile communications device 125 with communication features. For example, the mobile communications device 125 may send speed information and geographic coordinates to the service provider at predetermined intervals. In one embodiment, the mobile communications device 125 may contain a global positioning system (GPS) receiver in the mobile communications device 125 and that obtains the geographic coordinates from the GPS system. In this regard, the feature restrictor 131 may determine the activity of the user and the location of the mobile communications device 125 (e.g., on which highway the user is driving and the location). Further, the feature restrictor 131 may retrieve the rules for that location and stop communications from/to the mobile communications device 125 (e.g., among other functionalities).

In some embodiments, the feature restrictor 131 may be included in the mobile communications device 125. In this case, the feature restrictor 131 may be built in hardware and/or be a computer implemented product. In some embodiments, the feature restrictor 131 may provide notifications as to what restrictions are currently in place on a user interface of the mobile communications device 125. For example, in some embodiments, the feature restrictor 131 may include an application programming interface (API).

The feature restrictor 131 may include a mobile communications device monitor 130 and a mobile communications device controller 160. Although show as being part of the same computing device, in some embodiments, the mobile communications device monitor 130 and the mobile communications device controller 160 may be in different computing devices. The mobile communications device monitor 130 and the mobile communications device controller 160 may be at different locations and be connected via a link (e.g., a physical link or a wireless link). For example, the mobile communications device monitor 130 may be included in the mobile communications device 125 and the mobile communications device controller 160 may connect to the mobile communications device monitor 130 via the communications network 110.

Regardless of where the mobile communications device monitor 130 is positioned, the mobile communications device monitor 130 monitors the mobile communications device 125 and determines whether the mobile communications device 125 is in a moving vehicle 101. The mobile communications device monitor 130, if not present in the mobile communications device 125, may determine that the mobile communications device 125 is a device that is subject to legislation regarding restriction of device use in a moving vehicle through a mobile device number (MDN) or mobile subscriber integrated services digital network number (MSISDN), which uniquely identify the device on the network. For example, the mobile communications device monitor 130 may identify position changes that are above a predetermined threshold (e.g., >8 mph) as an indication that the mobile communications device 125 is in a moving vehicle 101. Other indicating factors and other techniques known in the art may be used to determine that the mobile communications device 125 is used within a moving vehicle 101.

In some embodiments, the vehicle 101 can determine whether a mobile communications device 125 is in the vehicle 101. For example, the mobile communication device 125 may be equipped with Near Field Communication (NFC) technology, which can be used to communicate with an NFC tag in the vehicle when in close proximity (e.g., <10 cm) to each other. Communication between the mobile communications device 125 and the vehicle 101 using Bluetooth and/or docking station are also contemplated.

As discussed above, the speed at which the location of the mobile communications device 125 is traveling may be used to indicate that the mobile communications device 125 is in a moving vehicle 101. For example, in some embodiments, the mobile communications device 125 monitor may determine that the mobile communications device 125 is in a moving vehicle by detecting whether the speed of the mobile communications device 125 is above a predetermined speed threshold.

Several factors may affect the predetermined speed threshold. For example, the threshold may be set at a speed that is above that for walking (e.g., 1-2 mph) or bicycling (e.g., >8 mph). In one example, the predetermined speed threshold is pre-programmed by the mobile communications device 125. Additionally, or alternatively, the speed threshold may be set by the service provider that provides the communications access to the mobile communications device 125. Further, the speed threshold may be set by the manufacturer of the moving vehicle 101. In other examples, the speed threshold may be set by the feature restrictor 131 or database 150. In one example, there is a maximum speed threshold, (e.g., over which functionality of the mobile communications device 125 is not restricted by the mobile communications device controller 160). For example, the restrictions may be removed (or different) when traveling in an airplane (e.g., >120 mph).

In certain embodiments, the mobile communications device monitor 130 may obtain information regarding the speed at which the mobile communications device 125 is being moved from a speed detector module (not shown) or a speed detection application program (not shown). The speed detector/speed detection program detects the speed at which the location of the mobile communications device 125 is being changed. In certain embodiments, the speed detection module/program may be included in the mobile communications device monitor 130. In some embodiments, the speed detector may be external to the mobile communications device monitor 130 and/or be physically or wirelessly coupled to the mobile communications device monitor 130. For example, in certain embodiments, the speed detector may be included in the vehicle 101 (if the mobile communications device 125 is connected to the vehicle 101), the mobile communications device 125, or downstream with respect to the mobile communications device monitor 130 and within the communications network 110 or in an element connected to the communications network 110.

As discussed above, the speed of the mobile communications device monitor 130 may be provided by the GPS receiver of the mobile communications device 125. In one example, the mobile communications device monitor 130 may determine the speed of the mobile communications device 125 through cell tower triangulation. In other embodiments, the mobile communications device 125 and the vehicle in which the mobile communications device 125 is traveling may communicate, with the vehicle transmitting speed to the mobile communications device 125.

In one example, the mobile communications device monitor 130 may continuously monitor the speed at which the location of the mobile communications device 125 changes. Additionally or alternatively, the mobile communications device monitor 130 may determine the speed at which the mobile communications device 125 is being moved at predetermined intervals (e.g., to conserver power). In one example the predetermined intervals depend on the distance from a geographic boundary. In one example, the time intervals for monitoring the speed at which the mobile communications device 125 is being moved may be set by the manufacturer of the mobile communications device 125 or by the service provider of the mobile communications functions.

The mobile communications device monitor 130 may further determine the geographical location and locality in which the mobile communications device monitor 130 is traveling. Various mobile communications device tracking schemes may be used. For example, in some embodiments, multilateration or triangulation of radio signals between radio towers of the network 110 and the mobile communications device 125 may be used to determine the location of the mobile communications device 125. Additionally or alternatively, global system for mobile communication (GSM) localization may be used to determine the location of the mobile device 125. Further, in certain embodiments, the mobile communications device monitor 130 may use GPS information to determine the geographical location of the mobile communications device 125.

In some embodiments, the GSM localization may be network based. Specifically, network infrastructure (e.g., antenna or base station location relative to the mobile communications device 125) may be used to identify the location of the mobile communications device 125. In certain embodiments, a device-based technology that requires installation of client software on the mobile communications device 125 may be utilized to determine the location of the mobile communications device 125. In some embodiments, a subscriber identity module (SIM, not shown) that may include, for example, personal information of the account holder, his or her phone number, address book, text messages, and other data is included in the mobile communications device 125 to help identify the mobile communications device 125. For example, the SIM may also be used to obtain information identifying the cell site serving the mobile communications device 125 and thereby obtain the location of the mobile communications device 125. In some embodiments, various combinations of the identification schemes described above may be utilized to determine the location of the mobile communications device 125.

Once the location of the mobile communications device 125 is identified, information regarding the specific locality (e.g., state or town) in which the mobile communications device 125 is positioned may be obtained using the location information. In certain embodiments, the geographic coordinates of the location of the mobile communications device 125 may be utilized to specify the locality in which the mobile communications device 125 is positioned.

In certain embodiments, the mobile communications device monitor 130 may monitor the location and/or locality of the mobile communications device 125 to determine if the mobile communications device 125 has entered a new locality. Further, in some embodiments, the mobile communications device monitor 130 may store current locality information of the mobile communications device 125 (e.g., in a memory (not shown)) and use the stored locality information, at a later time, to determine whether the mobile communications device 125 has entered a different locality. For example, boundaries of each locality are stored and the geographical coordinates are compared to the present location of the mobile communications device 125. It should be noted that there may be nested ranges, such as a school zone (first locality) that is within a town (second locality) that is within a county (third locality) that is in a state (fourth locality). In one example, the restrictions are cumulative. If there are conflicts between the restrictions between the nested localities, the most restrictive restrictions hold.

If monitored periodically or sporadically, the time intervals at which the mobile communications device monitor 130 monitors the location and locality of the mobile communications device 125 may be provided by the network provider. In certain embodiments, the time intervals at which the location and locality of the mobile communications device 125 are monitored may be determined as a function of the speed at which the moving vehicle 101 is traveling.

In certain embodiments, location information indicating the distance between the current locality of the communications device and nearby localities may be used to determine the appropriate time intervals between the instances of mobile communications device 125 locality determination. For example, if it is determined that the moving vehicle 101 is currently positioned in New Brunswick, N.J. and is traveling west at the speed of 65 miles per hour, the distance and estimated travel time to nearby localities (e.g., estimated distance and travel time to Pennsylvania border) may be used in determining the appropriate time intervals between the instances of mobile communications device 125 position and locality determination.

In certain embodiments, the cardinal direction of the travel of the moving vehicle 101 may also be considered in determining the appropriate time interval. For example, if it is determined that the moving vehicle 101 is currently positioned in New Brunswick, N.J., depending on the cardinal direction of travel (e.g., traveling east to New York or west to Pennsylvania), the appropriate time interval between the instances of mobile communications device 125 locality determination may be calculated.

In one example, the frequency of the intervals may depend on the speed, location, type of road being traveled, and direction of travel. By way of example, assume that a user has just crossed the NJ-NY border. In this regard, the intervals may be very frequent. As the user moves further into NY (e.g., away from the boundary) the frequency of intervals decreases. In one example, the frequency of the intervals increases based on priority: (i) proximity to the boundary border; (ii) Direction (e.g., moving towards, away, or parallel to the border); and (iii) speed of travel. Based on these variables the soonest possible time that the user could reach the boundary is calculated. Another interval may be scheduled for this calculated time.

In event the mobile communications device monitor 130 determines that the mobile communications device 125 is in a moving vehicle, the mobile communications device controller 160 is signaled. Specifically, the mobile communications device monitor 130 forwards the obtained information regarding the position and locality of the communications device 125 to the mobile communications device controller 160. In certain embodiments, the mobile communications device monitor 130 and the mobile communications device controller 160 may be independent computing devices (such as servers) or application programs that are connected to each other (e.g., network connection). In some embodiments, the mobile communications device monitor 130 and mobile communications device controller 160 may be included in a single computing device or application program.

The mobile communications device controller 160, in response to the information obtained from the mobile communications monitor 130, communicates with a database 150 that includes certain information regarding the regions 199R1, . . . , 199Rn of the geographical area 199 covered by the driver's drive route. Specifically, the mobile communications device controller 160, in response to the information forwarded by the mobile communications device monitor, accesses a database 150 that includes information regarding the restrictions and limitations imposed on usage of communications devices in various localities, and obtains information pertaining to the restrictions and limitations imposed in the current locality in which the mobile communications device 125 is positioned. For example, the mobile communications device 125 may access the database 150 through the carrier's network via cellular data or Wi-Fi connection. The mobile communications device controller 160 utilizes the information obtained from the database 150 to control the usage of the mobile communications device 125.

The mobile communications device controller 160 utilizes the information included in the database 150 to determine the extent of communications limitation and/or restriction that should be imposed on the communications device. Appropriate restrictions are subsequently imposed on the mobile communications device 125. The restrictions may be imposed, depending on their type, by restricting device communications (e.g., turning off restricted features), restricting general access to the device (e.g., imposing a general software lock on the device), restricting access to device features (e.g., imposing a key pad lock to prevent text messaging), etc.

The database 150 may be owned and/or maintained by various entities. For example, in certain embodiments, the database 150 may be owned and/or maintained within the network 110 and/or by the service provider that provides the mobile communications connectivity to the mobile communications device 125. In some embodiments, the database 150 may be maintained locally within the mobile communications device 125. In certain embodiments, the database 150 may be maintained outside of the mobile communications device 125 and, upstream from the mobile communications device 125, in a server connected to the communications network 110. In this case the database 150 may be owned and/or maintained by a private third party or by a governmental agency.

The database 150 may include information regarding state and local laws/regulations that impose penalties for the usage of mobile devices while driving in various localities. In some embodiments, the database 150 may be a lookup table. In some embodiments, the database 150 may be updated as new laws/regulations are imposed or as changes made to the existing laws/regulations.

In certain embodiments, in addition to the information regarding legislation related to mobile communications device use while in a moving vehicle, the database 150 may include other information pertaining to the current locality in which the communications device is located. For example, the database 150 may include information regarding seatbelt laws (e.g., whether a passenger riding in the backseat of the vehicle 101 needs to wear a seatbelt), car seat laws (e.g., weight and age requirements for using car seats or booster seats), speed limits, etc. In certain embodiments, the database 150 may include (or query other databases for) local information and alerts, such as local news, local traffic reports and alerts, local weather reports and alerts, other local advisories (e.g., traffic conditions in the general area and/or along specific roads such as that being traveled currently by the vehicle 101), alarms, or alerts (e.g., amber alerts), etc. This information may be delivered to the mobile communications device 125 when the mobile communications device 125 is controlled or at a predetermined time before or after controlling the mobile communications device 125.

The mobile communications device monitor 130 continues to monitor the mobile communications device 125 to determine whether the mobile communications device 125 is still in a moving vehicle and if so, whether the mobile communications device 125 has entered a locality which may have different restrictions on usage of mobile communications devices from the previous locality. If it is determined that the communications device 125 has entered a new locality, the mobile communications device controller 160 is informed. In response, once again, the mobile communications device controller 160 accesses the database 150 to determine whether the geographical restrictions imposed in the new locality are different from those imposed in the previous locality. If so, the mobile communications device controller 160 modifies the imposed restrictions on the mobile communications device 125 accordingly.

For example, assuming that the mobile communications device 125 is positioned in a moving vehicle traveling in a region that does not allow usage of the mobile communications device 125 for conducting voice calls or text messaging while driving (e.g., a construction or school zone), the communications device controller 160 obtains this restriction information from the database 150 and restricts device communications for conducting voice calls and text messaging. For example, the user interface of the mobile communications device 125 may not display options for placing or answering calls. In one example, if a call in process when the user enters a locality that does not allow the use of a mobile communications device 125, the call is severed or a notification is provided to the user (e.g., via audible tone, haptic signal, visual signal, or any combination thereof). In one example, all non-hands-free use of a mobile communications device 125 is restricted. In one example, only emergency calls are not subject to restrictions.

In event the mobile communications device controller 160 is informed that the mobile communications device 125 has entered a new locality, the mobile communications device controller 160 accesses the database 150 again to obtain relevant restriction information for the new locality. The limitations and restrictions imposed on the mobile communications device 125 are modified based on the newly acquired information. For example, assuming that the mobile communications device 125 has moved from the region that did not allow usage of the mobile communications device 125 for conducting voice calls or text messaging while driving to a region that allows for usage of mobile communications device for conducting voice calls but restricts usage for text messaging, the communications device controller 160 maintains the previously imposed limitations on text messaging features but permits the mobile communications device 125 to conduct voice calls.

In certain embodiments, in addition to or in place of restricting the communications features, the mobile communications device controller 160 may inform the driver 120 of the imposed limitations. For example, in one embodiment, the mobile communications device controller 160 may display a listing of available and restricted function on a display screen (not shown) of or connected with the mobile communications device 125. In certain embodiments, the mobile communications device 125 may include an application programming interface or a user interface that displays a listing of available and restricted function in a current geographical locality and/or provides the user with a summary of features that may be used in the current locality while driving.

In certain embodiments, in addition to or in place of restricting mobile communications of the driver 120 or notifying the driver of possible restrictions usage of mobile communications devices, the mobile communications device controller 160 may notify the driver 120 of other information regarding the current locality in which the mobile communications device 125 is located. The mobile communications device 125 of the driver can be determined in several ways. For example, a connection to a car dock, connection via Bluetooth, etc., is indicative that the communications device 125 is associated with the driver (e.g., and not a passenger). In one example, the driver indicates on the user interface of the mobile communications device 125 that it is that of a driver, thereby being able to receive restriction updates in different localities.

In one example, the mobile communications device controller 160 may provide the driver 120 with information regarding seatbelt laws, car seat laws, etc. In certain embodiments, the mobile communications device controller 160 may provide the driver 120 with local information and alerts, such as local news, local traffic reports and alerts, local weather reports and alerts, other local advisories, alarms, or alerts (e.g., amber alerts), etc.

In certain embodiments, the mobile communications device controller 160 may provide the driver 120 with instructions that assist the driver 120 in complying with local laws and regulations. Further, in certain embodiments, the mobile communications device controller 160 may provide the driver with instructions that ensure the driver's safety. For example, in certain embodiments, the mobile communications device controller 160 may inform the driver 120 that certain speed requirements are in effect due to the existing road or weather conditions.

In certain embodiments, the mobile communications device controller 160 may communicate with the driver 120 through an audio or video system of the moving vehicle 101 (e.g., through a wired or Bluetooth connection between the mobile communications device 125 and the vehicle 101. For example, in some embodiments, information regarding local laws/regulations concerning usage of mobile communications devices and/or local information, alarms, and alerts may be communicated with the driver 120 through a radio included in the moving vehicle 101. The video or audio system of the vehicle 101 may be built into the vehicle 101 or be an external unit that has been coupled with the car (e.g., via a physical connection or wirelessly).

In certain embodiments, the vehicle 101 may be equipped with a dock 170 for docking the driver's mobile communications device 125 and providing the driver 120 with hands-free access to the mobile communications device 125. The dock 170 may be placed anywhere within the moving vehicle 101 that is accessible to the driver 120. The dock 170 may be a built-in unit that is installed at the time of manufacture by the vehicle 101 manufacturer or an external unit that is installed in the vehicle 101. The dock 170 may provide the driver 120 with the ability to conduct hands-free communications calls.

In certain embodiments, the mobile communications device 125 is able to electronically detect that it is installed in the dock 170. In some embodiments, the mobile communications device monitor 130 may obtain certain information from the mobile communications device 125, over the communications network 110, indicating that the mobile communications device 125 is in a docked state (i.e., coupled with the dock 170).

Further, although not shown, in some embodiments, the driver 120 may use a headset or a Bluetooth system that enables the driver 120 to use his/her mobile communications device 125 in a hands-free mode. Other hands-free options available in the art may be used to provide the driver 120 with hands-free access to his/her mobile communications device 125.

In some embodiments, if the mobile communications device 125 is determined to be in a hands-free mode (e.g., docked state or using a Bluetooth system) no further action is taken and the driver is allowed to utilize the communication features provided by the mobile communications device 125.

In certain embodiments, if the mobile communications device 125 is determined to be in the hands-free mode, the mobile communications device monitor 130 informs the mobile communications controller 160 that the mobile communications device 125 is in the hands-free mode. In some embodiments, if it is determined that the mobile communications device 125 is in an area that allows hands-free operation, the mobile communications controller 160, may restrict or cause restrictions of all communication features to the mobile device 125 other than the features that have an audio interface.

In certain embodiments, the mobile communications controller, in response to determining that the mobile communications device 125 is in the hands-free states, accesses the database 150 to determine the communication features that are available to the driver 120 while using a hands-free enabled mobile device 125 in his/her current locality. Once the available features for a hands-free enabled mobile device are determined, the mobile communications device controller 160 utilizes the determined information to restrict or cause restrictions of communication features accordingly.

Figure 2:
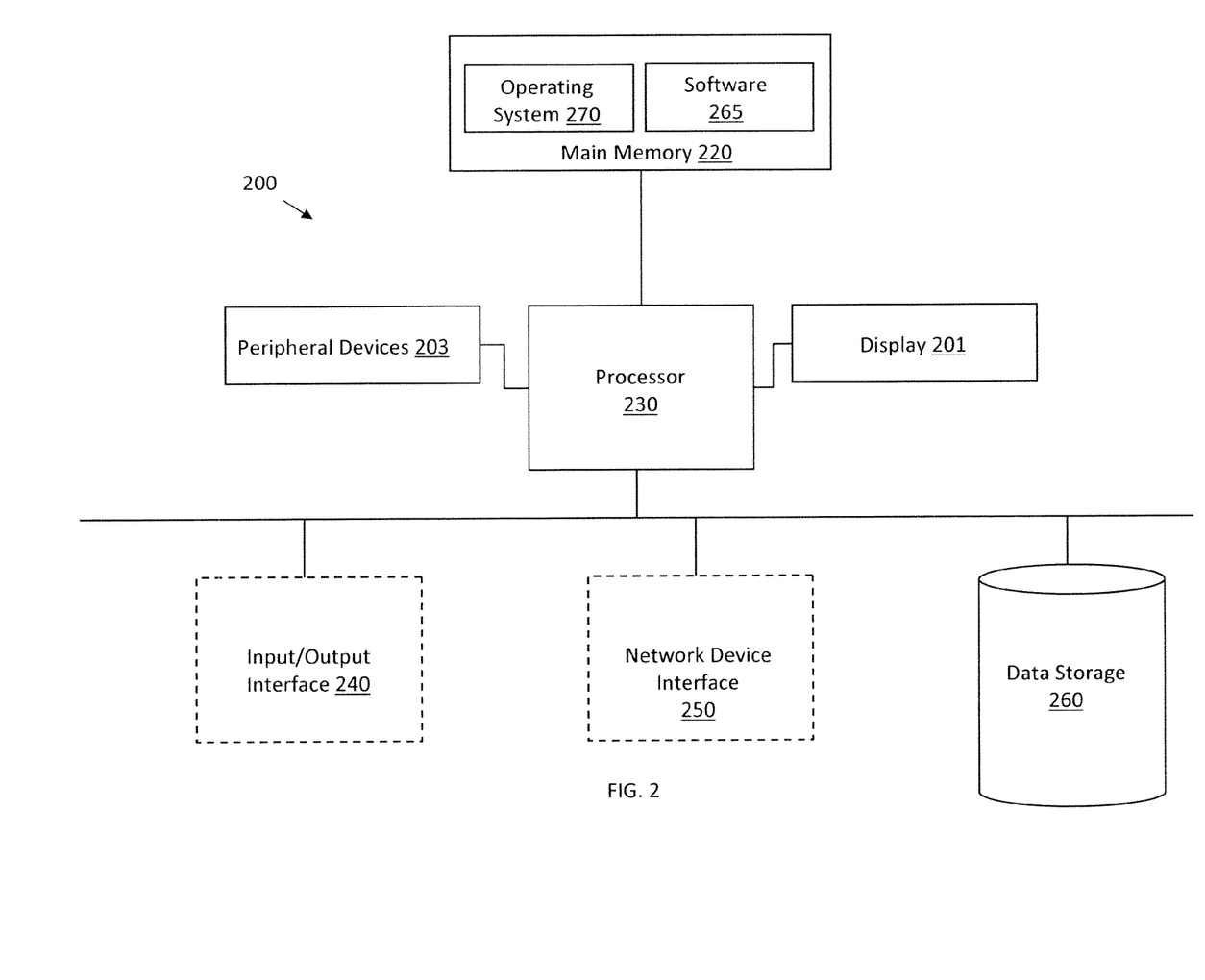
FIG. 2 is a block diagram of a system that may be used to implement a feature restrictor according to certain embodiments disclosed herein.

FIG. 2 is a block diagram of a system 200 that may be used to implement a feature restrictor according to certain embodiments disclosed herein. In some embodiments, the system 200 may be an independent unit that communicates with the mobile communications device 125 shown in FIG. 1 via a network device interface 250. The network device interface 250 provides the system with access to a network connection. In certain embodiments, the system 200 or portions of the system 200 may be included in the mobile communications device 250.

The system 200 may include a processor 230 (e.g., Central Processing Unit) that carries out the operations of the system 200, executes various instructions, and manipulates data structures from the main memory 220. The processor 230 may be coupled to a main memory 220. The main memory 220 may be a computer-readable memory and include combinations of non-volatile memory devices. The main memory 220 may be configured to hold various software 265 and computer-executable instructions and data structures including computer-executable instructions and data structures that implement aspects of the techniques described herein. In certain embodiments, the main memory 220 may be included in a subscriber identity module (SIM) card of mobile communications device 125 (shown in FIG. 1). In certain embodiments, the main memory 220 may be included in a universal integrated circuit card (UICC) of mobile communications device 125.

In some embodiments, the software 265 may implement the procedures for monitoring the mobile communications device, as described above with relation to the mobile communication device monitor 130 of FIG. 1, to determine if the mobile communications device is in a moving vehicle and if so determine its location and locality. Further, in certain embodiments, the software 265 may implement the procedures for controlling the mobile communications device 125, as described in relation to mobile communications device controller 160 of FIG. 1.

The main memory 220 may also include an operating system 270 that implements various conventional operating system functions including memory management and controlled access to various devices, such as a database storage 260, and task and process scheduling. The data storage 260 may include content, for use with embodiments disclosed herein, such as database 150. In some embodiments, information indicating the current position of the moving vehicle 101 may be stored in the data storage 260.

The processor 230 may be coupled to various interfaces via an input/output (I/O) device interface 240. The I/O device interface 240 may include logic to interface with various input and/or output devices, such as a keypad or mouse and with the processor 230, and allow signals to be transferred between the processor 230 and other components. Further, interface devices such as speaker (not shown), microphone (not shown), peripheral devices 203, and display 201 may be used to transfer signals to/from the processor 230 and main memory 220. In some embodiments, the input/output interface 240 may include a USB port (not shown).

Figure 3:
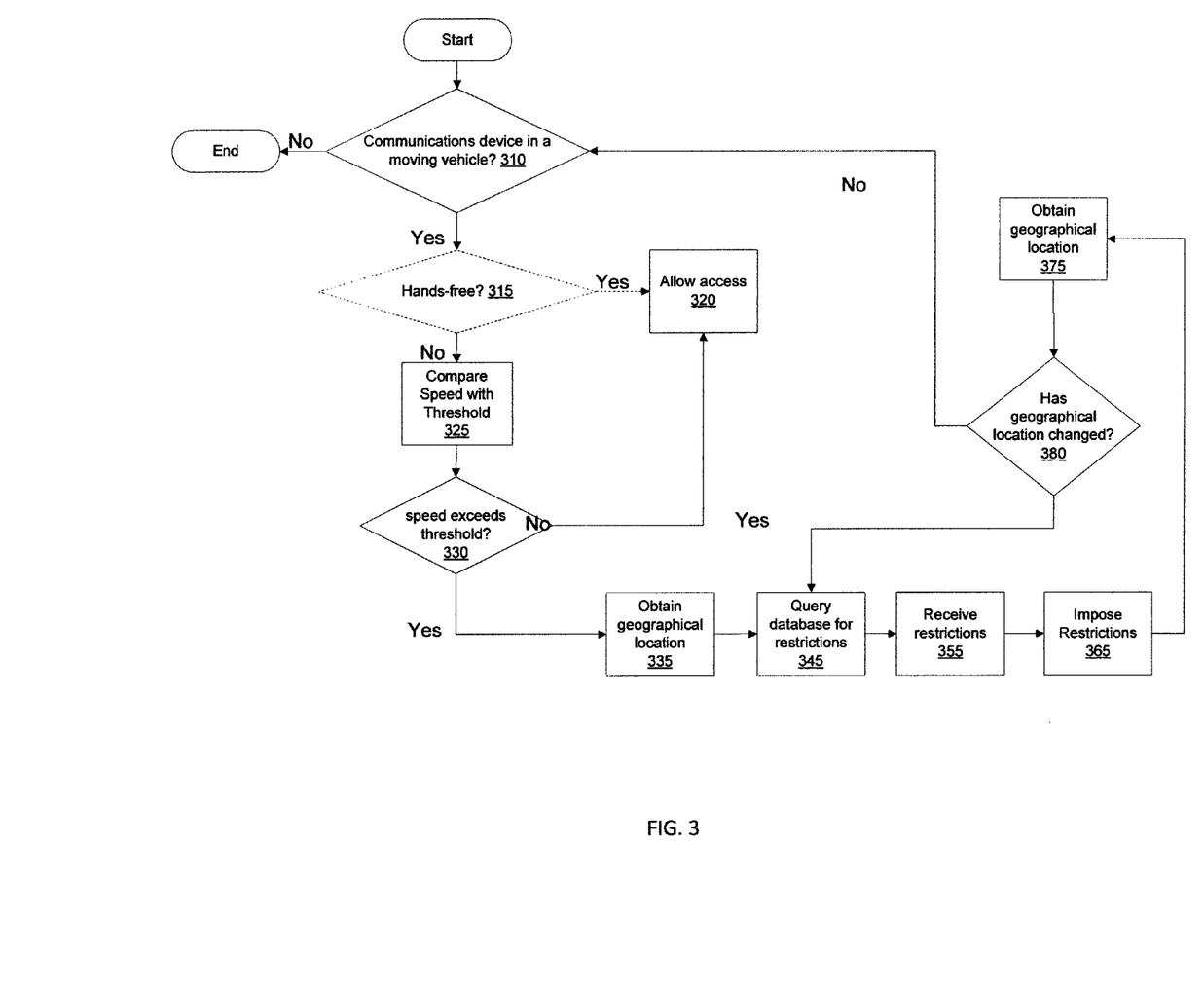
FIG. 3 is a flow diagram of procedures for certain embodiments disclosed herein.

FIG. 3 is a flow diagram of procedures for certain embodiments disclosed herein. The procedures begin by determining whether the mobile communications device 125 (FIG. 1) is in a moving vehicle 310. As noted previously, the speed at which the location of the mobile communications device is changing may be used as an indication of whether the mobile communications device is in a moving vehicle.

If the device is determined as not being in a moving vehicle, no action is required and a user may be allowed to use all communication features offered by the mobile communications device 125. In one example, upon determining that the mobile communications device 125 is in a moving vehicle, it is determined whether the mobile communications device 125 is in a hands-free state 315 (e.g., allows hands free operation) and the mobile communications device 125 is used in a hands-free mode. As noted previously, in some embodiments, the mobile communications device 125 may indicate (e.g., by transmission of a signal to the mobile device monitor 130 (FIG. 1)) that it is in the hands-free mode. Alternatively, in certain embodiments, a dock or a hands-free enabling unit 170 (FIG. 1) may indicate to the mobile device monitor 130 that it is coupled with the mobile communications device 125. If the mobile communications device 125 is determined to be in a hands-free state, access to communications features are allowed 320. In some embodiments, the determination of whether the mobile communications device 125 is operated in a hands-free mode 315 does not immediately provide access to the communications features. Rather, it is a prerequisite to being able to move on to the step of comparing the speed at which the mobile communications device 125 is traveling to a speed threshold (e.g., 325).

For example, in step 325, the speed at which the mobile communications device 125 is traveling is compared against a speed threshold. If the speed threshold is below a certain predetermined level (or outside a predetermined range), access to the communications features of the mobile communications device 125 is allowed. Of course, in other embodiments, the communications features of the mobile communications device 125 may be restricted for reasons other than those of being in a moving vehicle (e.g., the mobile communications device 125 being located in a restricted area).

The speed threshold may be set using various factors. For example, in certain embodiments, the threshold may be set at a level that corresponds to traveling by any method other than walking. In certain embodiments, the threshold may be set at a level corresponding to traveling speed (e.g., on a roadway). As indicated above, in other embodiments, the speed threshold may be the lower speed of a speed range outside of which communications are permitted to proceed without restriction by the mobile communications device controller 160.

Although not shown, in some embodiments, the speed threshold may vary dynamically and depend on the local speed limits. In such embodiments, the position and locality of the mobile communications device 125 may be determined, prior to comparing the speed against the threshold. Once the locality is determined, a database (e.g., database 150) including appropriate speed thresholds for each locality may be accessed to determine the appropriate speed threshold that should be applied. For example, the mobile device monitor 130 may determine that the mobile communications device 125 is in a moving vehicle that is traveling in a school zone. In response, the mobile device controller 160 accesses the database 150 to obtain the appropriate speed threshold that should be applied in a school zone. The obtained speed threshold is used to determine whether the automatic restrictions described herein should be applied to the mobile communications device 125 or whether communication features should be provided 320.

In some embodiments, the speed threshold may vary depending on the amount of traffic on the travel route of the moving vehicle 101. In certain embodiments, the speed threshold may vary depending on the time of the day. For example, in some embodiments, the speed threshold may be reduced at dusk and returned to a higher level at dawn.

In some embodiments, the speed threshold may be pre-programmed by the original device manufacturer of the mobile communications device 125. Additionally, or alternatively, in certain embodiments, the speed threshold may be set by the service provider that provides the communications access to the mobile communications device 125. Further, in some embodiments, the speed threshold may be set by the manufacturer of the moving vehicle 101. In other embodiments, the speed threshold is set by a third-party or governmental database (such as database 150).

In the event the speed at which the mobile communications device 125 is being moved exceeds the predetermined threshold, the geographical location (e.g., position and locality) of the mobile communications device 125 is determined 335. The database 150 is accessed 345 and information pertaining to appropriate restrictions for the determined geographical location is obtained 365. If needed, appropriate restrictions are imposed on the mobile communications device 365.

The procedures continue to monitor the mobile communications device 125 as indicated in relation to FIG. 1 (e.g., every few minutes or so depending on the speed and perhaps distance from a geographic boundary), obtain its geographical location 375, and determine if the geographical location of the mobile communications device 125 has changed 380. If the geographical location has not appreciably changed (as determined using settings within the mobile communications device 125, e.g., 100 feet within a predetermined time), the procedures once again determine if the device is in a moving vehicle 310. If the geographical location has changed, the database is queried for restrictions 345 to determine if the previously imposed restrictions should be modified.

Although not shown in FIG. 3, in certain embodiments, if it is determined that the device is in a hands-free state 315, the procedures may proceed to compare the speed threshold 325 and if exceeding a certain threshold, obtain the geographical location of the device 335 and query the database 345 to determine if mobile communications device 125 usage in a hands-free state is permitted. Such embodiments provide access to communication features if the information obtained from the database indicates that usage of the device 125 in the hands-free state is permitted.

Certain embodiments may allow for emergency communications calls to be conducted regardless of the restrictions indicated by the database. Thus, upon determining that the mobile communications device is used to place an emergency communications call, the communication restrictions are prevented from being imposed.

It is worth noting that the placement of one or more of the steps in the method shown in FIG. 3 may be different. For example, detection of whether the mobile communications device 125 is docked may occur before determining the speed or whether or not functions are to be controlled, thereby avoiding the processing involved in these latter steps. Similarly, other embodiments may not contain some of the steps shown in FIG. 3. For example, as indicated step 320 may be eliminated as some communication features such as texting may not be permitted even though the mobile communications device 125 is in a hands-free state.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining a time interval as a function of estimated travel time or estimated travel distance for arrival of a mobile communications device disposed in a moving vehicle at a next geographic location having different communication restrictions including legislatively enacted restrictions on usage of the mobile communications device while disposed in the moving vehicle in a geographical area than at a current location where the mobile communications device is positioned, wherein the time interval is determined by:
  calculating a proximity to a boundary border between the current location and the next geographic location;
  calculating a direction of travel of the vehicle with respect to the boundary border, including determining whether the vehicle is moving towards, away, or parallel to the boundary border;
  calculating a speed of travel of the vehicle;
  calculating a soonest possible time that the vehicle reaches the boundary border based on the calculated proximity to the boundary border, the calculated direction of travel with respect to the boundary border, and the calculated speed of the vehicle; and
  setting the time interval such that the time interval is scheduled for the calculated soonest possible time that the vehicle reaches the boundary border;
determining a geographical location of the mobile communications device disposed in the moving vehicle and that the geographical location of the mobile communications device is at the next geographic location at the determined time interval;
after determining the geographical location of the mobile communications device is at the next geographic location, obtaining information relating to the communication restrictions on the mobile communications device, the communication restrictions due to the mobile communications device being in the moving vehicle and specific to the next geographic location; and
controlling communications of the mobile communications device in accordance with the obtained communication restrictions on the mobile communications device.

2. The method of claim 1 further comprising obtaining the information from a network-accessed database containing information on communication restrictions on a mobile communications device, due to being in a moving vehicle, over various geographical locations.

3. The method of claim 1 further comprising monitoring the geographical location of the mobile communications device and modifying the communication restrictions imposed on the mobile communications device in response to determining that the mobile communications device has entered a new geographical location in which different communication restrictions are imposed on the mobile communications device due to being in the moving vehicle.

4. The method of claim 3 wherein the mobile communications functions include at least one of voice call, video call, web browsing, text messaging, or instant messaging.

5. The method of claim 1 wherein controlling communications of the mobile communications device comprises:
  upon determining that hands-free operation is restricted from the obtained communication restrictions, preventing operation of the mobile communications device.

6. The method of claim 1 wherein controlling communications of the mobile communications device comprises:
  upon determining that the mobile communications device is used to place an emergency communications call preventing the communication restrictions from being imposed.

7. The method of claim 1, wherein the estimated travel time or estimated travel distance for arrival is based on at least one of: road conditions, weather conditions, or the road or area being traveled.

8. The method of claim 1, wherein the communications restrictions include legislatively enacted restrictions on usage of the mobile communications device disposed in the moving vehicle that are different from a previous locality where the mobile communications device was positioned.

9. A system comprising:
  a mobile device monitor arranged to:
    determine a time interval as a function of estimated travel time or estimated travel distance for arrival of a mobile communications device disposed in a moving vehicle at a next geographic location having different communication restrictions including legislatively enacted restrictions on usage of the mobile communications device while disposed in the moving vehicle in a geographical area than at a current location where the mobile communications device is positioned, wherein the time interval is determined by:
      calculating a proximity to a boundary border between the current location and the next geographic location;
      calculating a direction of travel of the vehicle with respect to the boundary border, including determining whether the vehicle is moving towards, away, or parallel to the boundary border;
      calculating a speed of travel of the vehicle;
      calculating a soonest possible time that the vehicle reaches the boundary border based on the calculated proximity to the boundary border, the calculated direction of travel with respect to the boundary border, and the calculated speed of the vehicle; and
      setting the time interval such that the time interval is scheduled for the calculated soonest possible time that the vehicle reaches the boundary border;
    determine a geographical location of the mobile communications device disposed in the moving vehicle and that the geographical location of the mobile communications device is at the next geographic location at the determined time interval; and
  a mobile device controller arranged to:
    obtain information relating to the communication restrictions imposed on the mobile communications device, the communication restrictions due to the mobile communications device being in the moving vehicle and specific to the next geographical location,
    control communications of the mobile communications device in accordance with the obtained communication restrictions on the mobile communications device.

10. The system of claim 9 wherein the mobile device controller is further arranged to obtain the information from a database containing information on communication restrictions imposed on the mobile communications device, due to being in the moving vehicle, over various geographical locations.

11. The system of claim 9 wherein the mobile device monitor is further arranged to monitor the geographical location of the mobile communications device and in response to determining that the mobile communications device has entered a new geographical location in which different communication restrictions are imposed on the mobile communications device due to being in the moving vehicle, prompt the mobile device controller to revise the communication restrictions imposed on the mobile communications device.

12. The system of claim 11 wherein the mobile communications functions include at least one of voice call, video call, web browsing, text messaging, or instant messaging.

13. The system of claim 9 wherein the mobile device controller is further arranged to, upon determining that hands-free operation is restricted from the obtained communication restrictions, prevent operation of the mobile communications device.

14. The system of claim 9 wherein the mobile device controller is further arranged to, upon determining that the mobile communications device is used to place an emergency communications call, prevent the communication restrictions from being imposed on the communications device.

15. The system of claim 9 wherein the mobile device monitor is arranged to determine the estimated travel time or estimated travel distance for arrival based on road conditions, weather conditions, and the road or area being traveled.

* * * * *